(12) United States Patent
Fujino (10) Patent No.: US 7,730,306 B2
(45) Date of Patent: Jun. 1, 2010

(54) INFORMATION PROCESSING APPARATUS WITH USE-RESTRICTED FUNCTIONS, AND SYSTEM AND METHOD FOR CANCELING USE RESTRICTION

(75) Inventor: Akinobu Fujino, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1179 days.

(21) Appl. No.: 11/329,645

(22) Filed: Jan. 10, 2006

(65) Prior Publication Data
US 2007/0192868 A1 Aug. 16, 2007

(30) Foreign Application Priority Data
Jan. 20, 2005 (JP) ............................. 2005-012731

(51) Int. Cl.
*H04L 9/00* (2006.01)
*H04L 9/32* (2006.01)
(52) U.S. Cl. ................... 713/168; 713/189; 713/193; 713/194
(58) Field of Classification Search ......... 713/168–170, 713/176, 189, 192–194; 726/26–33; 380/277
See application file for complete search history.

(56) References Cited

U.S. PATENT DOCUMENTS

| | | | |
|---|---|---|---|
| 4,821,107 A | | 4/1989 | Naito et al. |
| 5,499,298 A | * | 3/1996 | Narasimhalu et al. ......... 705/54 |
| 5,790,664 A | | 8/1998 | Coley et al. |
| 7,096,282 B1 | | 8/2006 | Wille |
| 7,249,898 B2 | | 7/2007 | Watanabe |
| 7,353,404 B2 | * | 4/2008 | Hashimoto et al. .......... 713/194 |
| 2002/0029347 A1 | | 3/2002 | Edelman |
| 2002/0136405 A1 | | 9/2002 | Hori |
| 2002/0141591 A1 | | 10/2002 | Hawkes et al. |
| 2004/0102183 A1 | | 5/2004 | Haub et al. |
| 2004/0215969 A1 | | 10/2004 | Nance et al. |
| 2005/0129245 A1 | * | 6/2005 | Takaoka .................. 380/277 |

FOREIGN PATENT DOCUMENTS

| | | |
|---|---|---|
| CN | 1430139 | 7/2003 |
| JP | 2001-309099 | 11/2001 |
| JP | 2002-288044 | 10/2002 |
| JP | 2003-506778 | 2/2003 |
| JP | 2004-213469 | 7/2004 |
| WO | 01/42888 | 6/2001 |

* cited by examiner

*Primary Examiner*—Hosuk Song
(74) *Attorney, Agent, or Firm*—David G. Conlin; Steven M. Jensen; Edwards Angell Palmer & Dodge LLP

(57) ABSTRACT

Processing for extending function of an information processing apparatus having functions, the use of which is restricted, is managed by canceling the restriction of the use of function in association with an information storing device which is connected to information processing apparatus A, B. The information storing device holds information on a list of product keys and the number of possible function extensions (the number of restriction cancellations and the number of licenses) as information for canceling the restriction in advance. The number of information processing apparatus, the functions of which are extended, is managed by reducing the number of possible function extensions each time when one function of the information processing apparatus A is extended. Unnecessary function is deleted from the information processing apparatus A so as to increase the number of licenses. Correspondingly, the function of the information processing apparatus B can be extended.

15 Claims, 11 Drawing Sheets

INFORMATION PROCESSING APPARATUS WITH USE-RESTRICTED FUNCTIONS, AND SYSTEM AND METHOD FOR CANCELING USE RESTRICTION

This non-provisional application claims priority under 35 U.S.C. §119(a) on Patent Application No. 2005-012731 filed in JAPAN on Jan. 20, 2005, the entire contents of which are hereby incorporated herein by reference.

FIELD OF THE INVENTION

The present invention relates to an information processing apparatus, information storing device, system for extending functions of information processing apparatus, method for extending functions of information processing apparatus, method for deleting functions thereof, and program for extending functions of information processing apparatus and program for deleting functions thereof and, in particular, to an information processing apparatus, information storing device, system for extending functions of information processing apparatus, method for extending functions of information processing apparatus, method for deleting functions thereof, and program for extending functions of information processing apparatus and program for deleting functions thereof which enable an information processing apparatus such as digital multi-function printer (MFP) having functions of copying machine, printer, facsimile machine and the like to quickly extend the functions thereof at a low cost after shipment thereof by restricting the use of the functions and/or canceling the restriction of the use of the functions according to need and also enable rational management of a plurality of information processing apparatus.

BACKGROUND OF THE INVENTION

An invention in which restriction of the functions of an image processing apparatus, the use of the functions of which is restricted is cancelled with a canceling key including an encrypted manufacture number of the apparatus for managing the functions of the apparatus is disclosed in Japanese Laid-Open Patent Publication No. 2001-309099. This image processing apparatus is implemented as a digital multi-function printer and the like. Extension of functions after shipment can be quickly implemented at a low cost. A main program which controls basic operations of the copying machine, printer and facsimile and a subprogram which controls additional operations of a network scanner when it is accessed in the main program are stored. If a user purchases an additional function package and transmits the manufacture number of the image processing apparatus and ID information of the purchased additional function package to a management apparatus, the management apparatus returns a cancellation key of encrypted manufacturing number. The returned cancellation key is decrypted by a control unit. If the decrypted number corresponds with the content of a storage unit, the access is enabled. Therefore, even after shipment, function extension can be quickly achieved at a low cost without exchanging circuit boards and/or memories.

In a method in which the restriction of the functions of conventional information processing apparatus is cancelled with a canceling key which is generated by using information specific to the information processing apparatus, the canceling key corresponds to the information processing apparatus in a one-to-one relationship. When the information processing apparatus is replaced with new one due to malfunction, there is a problem that the purchased function can not be transferred to new information processing apparatus even if the user paid for new function.

SUMMARY OF THE INVENTION

It is an object of the present invention to provide an information processing apparatus which is achieved by digital multi-function printer and the like in which a function extension permission can be quickly transferred to other information processing apparatus having similar functions as well as the information processing apparatus at a low cost by an apparatus managing system which is capable of quickly achieving extension of the functions after shipment at a low cost.

It is another object of the present invention to hold information on a function restriction canceling key and information on the number of licenses (the number of times of cancellations of restriction) in an information storing device, to provide an information processing apparatus with capability of assigning a license to the information processing apparatus which uses the information when the function restriction is cancelled and of returning a license when the cancellation is terminated so that a user can easily cancel the restricted function and transfer a license so as to use a function in new information processing apparatus.

It is a further object of the present invention to quickly respond changes in use environment and user's use intention by connecting an information storing device to a product key issuing server over a network such as the Internet for providing the information storing device with information on a canceling key which is issued by the product key issuing server and information on the number of licenses for quickly extend or reduce the functions of the information processing apparatus at a low cost.

It is a further object of the present invention to prevent unauthorized use of an information processing apparatus and an information storing device to achieve secure management thereof after their shipment by preventing copying of a program within the information processing apparatus and/or information storing device, unauthorized access to information held therein and tampering of information.

It is a further object of the present invention to provide an information processing apparatus having functions, the use of which is restricted, wherein the apparatus comprises a determining portion for determining whether or not the use restricted function is cancelled based upon information for function extension and information on the number of possible function extensions, which is held in an information storing device connected to the information processing apparatus.

It is a further object of the present invention to provide an information processing apparatus, wherein the apparatus comprises an encrypting and decrypting portion for encrypting and decrypting information on a communication path between the information processing apparatus and the information storing device for preventing unauthorized use of the information processing apparatus.

It is a further object of the present invention to provide an information processing apparatus, wherein the apparatus comprises an authenticating portion for authenticating an access to information in the information storing device to prevent unauthorized use of the apparatus.

It is a further object of the present invention to provide an information processing apparatus, wherein the apparatus comprises a checking portion for checking tampering of information in the information storing device to prevent unauthorized use of the apparatus.

It is a further object of the present invention to provide an information processing apparatus, wherein the apparatus communicates with the information storing device which holds information on a list of function restriction canceling keys necessary for function extension and the number of the possible function extensions and confirms the information on the number of the possible function extensions and acquires the function restriction canceling key if number of the possible function extensions is within the allowable range.

It is a further object of the present invention to provide an information processing apparatus, wherein the apparatus communicates with the information storing device which holds a function restriction canceling key generating function necessary for function extension and information on the number of the possible function extensions and dynamically generates a function restriction canceling key by using specific information from the information processing apparatus, confirms the information on the number of the possible function extensions and acquires the function restriction canceling key if the number of the possible function extensions is within the allowable range.

It is a further object of the present invention to provide an information processing apparatus, wherein the apparatus communicates with the information storing device which holds an almighty key which is capable of canceling all function restriction of information processing apparatus and information on the number of the possible function extensions, confirms the information on the number of the possible function extensions and acquires a function restriction canceling key if the number of the possible function extensions is within the allowable range.

It is a further object of the present invention to provide an information processing apparatus, wherein the apparatus communicates with the information storing device which holds a function restriction canceling key when the functions are initially introduced to the apparatus, information on the number of the possible function extensions and information on history of use start and completion, confirms the information on the number of the possible function extensions, acquires a function restriction canceling key if the number of the possible function extensions is within the allowable range and enables the function restriction canceling key to be used in other information processing apparatus.

It is a further object of the present invention to provide an information processing apparatus, wherein the apparatus communicates with the information storing device which holds information on a combination of a specifically assigned permission ID with a function restriction canceling key and information on the number of the possible function extensions, checks the function restriction canceling key by using the permission ID, confirms the information on the number of the possible function extensions and acquires the function restriction canceling key if the number of the possible function extensions is within the allowable range.

It is a further object of the present invention to provide an information processing apparatus, wherein the information storing device comprises an encrypting portion for generating a temporary random number ID-1 for encrypting a function restriction canceling key to encrypt the function restriction canceling key by using the random number ID-1 on check-out communication for assigning a function restriction canceling key from the information storing device to the information processing apparatus, and a transferring portion for encrypting the random number ID-1 by using a public key of the information processing apparatus to communicate it to the information processing apparatus, and wherein the information processing apparatus comprises an encrypting portion for generating a random number ID-2 for encrypting the function restriction canceling key to encrypt the function restriction canceling key by using the random number ID-2 on check-in communication for returning a function restriction canceling key from the information processing apparatus to the information storing device, and a transferring portion for encrypting the random number ID-2 by using a public key of the information storing device to communicate it to the information storing device.

It is a further object of the present invention to provide an information storing device, wherein the device holds information for function extension and information on the number of possible function extensions as information which is necessary for management of the function extension of an information processing apparatus having functions, the use of which is restricted and the device can be connected to the information processing apparatus.

It is a further object of the present invention to provide an information storing device, wherein the information storing device is connected to a product key issuing server and holds information necessary for management of function extension of the information processing apparatus which is issued by the product key issuing server.

It is a further object of the present invention to provide a system for extending functions of an information processing apparatus, wherein the system comprises an information processing apparatus having functions, the use of which is restricted and an information storing device in which information for the function extension and information on the number of possible function extensions is recorded therein, a check-out for assigning a function restriction canceling key to the information processing apparatus from the information storing device is conducted, a check-in for returning the function restriction canceling key from the information processing apparatus to the information storing device is conducted, and the canceling of the restricted function of the information processing apparatus is conducted based upon the information on the number of possible function extensions held in the information storing device.

It is a further object of the present invention to provide a method for extending the functions of an information processing apparatus, wherein the method comprises the steps of:

connecting an information storing device in which information for function extension and information on the number of possible function extensions is held to an information processing apparatus having functions, the use of which is restricted;

selecting a use start function in the information processing apparatus;

checking whether information on the number of the possible function extensions concerning the use start function is within the allowable range;

decreasing the number of the possible function extensions if it is within the allowable range; and informing the information processing apparatus of the information for function extension.

It is a further object of the present invention to provide a method for deleting the functions of an information processing apparatus, wherein the method comprises the steps of:

connecting an information storing device in which information for function extension and information on the number of possible function extensions is held to an information processing apparatus having functions, the use of which is restricted;

selecting a use terminating function in the information processing apparatus;

deleting a function restriction canceling key for selected use terminating function from the information processing apparatus; and increasing the number of possible function extensions.

It is a further object of the present invention to provide a program for extending the functions of an information processing apparatus, wherein the method for extending functions described above is conducted.

It is a further object of the present invention to provide a program for deleting the functions of an information processing apparatus, wherein the method for deleting functions described above is conducted.

PREFERRED EMBODIMENTS OF THE INVENTION

It is an object of the present invention to achieve the function extension of an information processing apparatus which is implemented in a digital multi-function printer and the like after shipment thereof at a low cost and quickly and to provide the information processing apparatus with a capability of quickly transferring at a low cost a permission of the function extension to other information processing apparatus having similar functions as well as specific information processing apparatus. Therefore, the function extending operation of the information processing apparatus having functions the use of which is restricted like digital multi-function printer is managed in association with the information storing device. The information storing device holds information for extending the functions of the information processing apparatus and information on the number of possible function extensions (the number of times of restriction cancellations and the number of licenses) in advance. The number of the information processing apparatuses, the function of which is extended, is managed by reducing the number of possible function extensions each time when one function of the information processing apparatus is extended.

Now, embodiments of the present invention will be described with reference to FIGS. 1 through 12.

Embodiment 1

Figure 1:
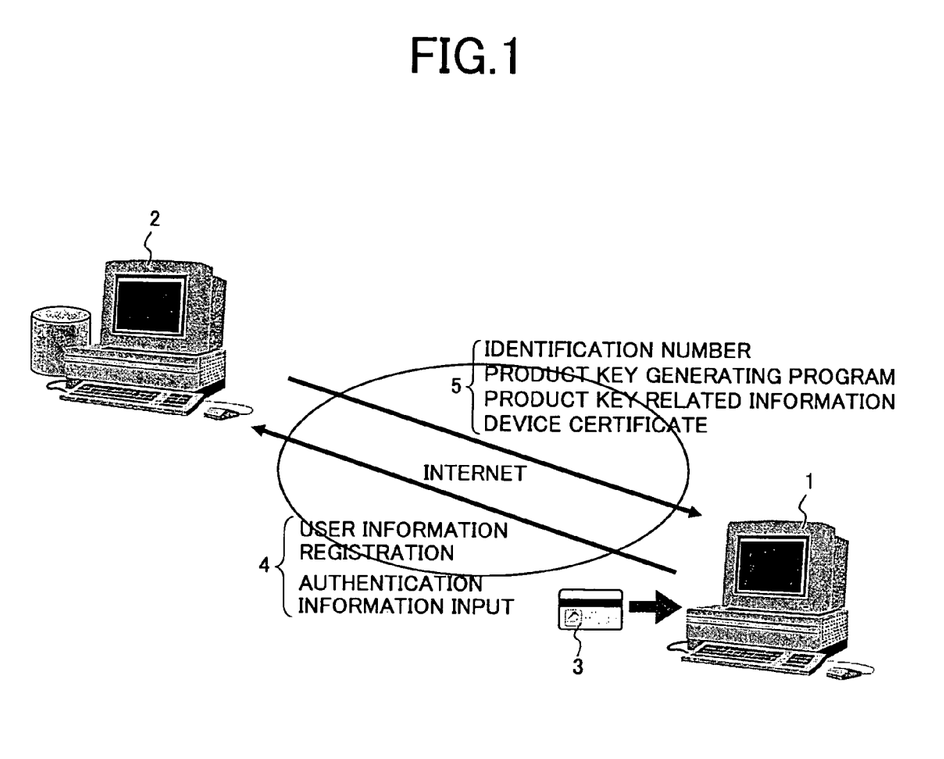
FIG. 1 is a view showing how a product key is saved in an information storing device in an information processing apparatus of embodiment 1 of the present invention.

FIG. 1 is a view showing how a product key is saved in an information storing device in an information processing apparatus of an embodiment 1 of the present invention.

In order to conduct management of the function extension of the information processing apparatus by using the information storing device 3, registration of user information and input of authentication information 4 is conducted by a personal computer (PC) 1. For example, a product key issuing server 2 is accessed over the Internet for saving in the personal computer (PC) 1, product key management information 5 which is necessary for management of an identification number, product key generating program, product key related information, device certificate, etc. Subsequently, the information storing device 3 is connected to PC 1 for writing in the information storing device 3 the product key related information 5 which is necessary for management of functions of the information processing apparatus. Although the information processing apparatus is not illustrated herein, it may include an image forming apparatus such as a digital multi-functional printer (MFP) having a plurality of functions of copy machine, printer, facsimile machine, scanner and the like.

Figure 2:
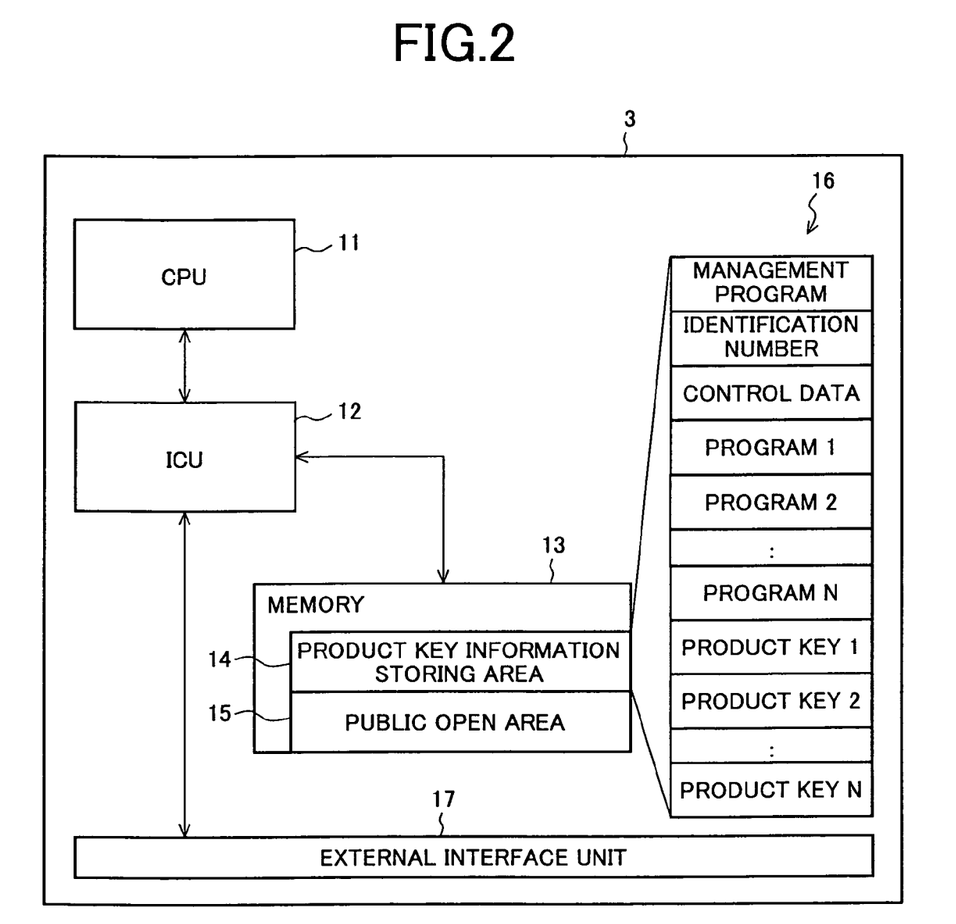
FIG. 2 is a block diagram showing the configuration of the information storing device.

FIG. 2 is a block diagram showing the configuration of the information storing device.

The information storing device 3 comprises a CPU (Central Processing Unit) 11 for processing and operating information, an ICU (Interface Control Unit) 12 for controlling input/output of data (product key, license information, and management information thereof, etc.) to/from the information processing apparatus, a memory 13 for storing information, and an external interface unit 17 which executes connection processing with external systems. The writing in the memory 13 is controlled based upon the operation result by the CPU 11. Although the information storing device 3 can be implemented by information recording devices in any form, it may be preferably an information recording device which can be externally attached to the information processing apparatus. For example, IC cards or various disc devices may be used.

The memory 13 is divided into a product key information storing area 14 and a public open area 15. An access to the product key information storing area 14 is controlled by ICU 12. The product key information storing area 14 is configured so that it has a storing area 16. In the storing area 16, a management program manages data within the product key information storing area, a recognition number is specifically defined for the information storing device, and control data gives program control information to the management program and includes information on licenses. Programs generate a product key and the product key is a generated product key. When product key management information, etc. is written in the information storing device 3, a user connects the information storing device 3 to the personal computer (PC) 1 so that the information storing device 3 is accessible from the PC 1.

Figure 3:
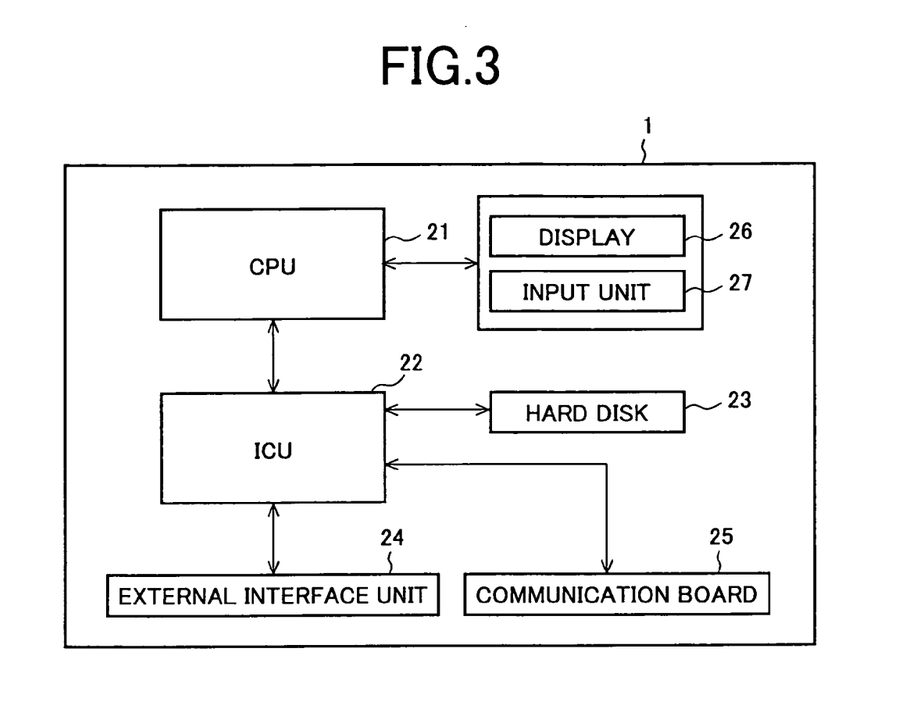
FIG. 3 is a block diagram showing the configuration of a personal computer (PC).

FIG. 3 is a block diagram showing the configuration of the personal computer (PC).

The personal computer (PC) 1 comprises a CPU 21 for processing and operating information, an ICU 22 for controlling input/output related with the information storing device 3 and display on the screen, a hard disk 23 for storing information thereon, an external interface unit 24 for connecting the personal computer to general external storing devices, a communication board 25 which connects the personal computer to a wide area network, a display 26 which allows the user to input/output information, and an input device 27.

Figure 4:
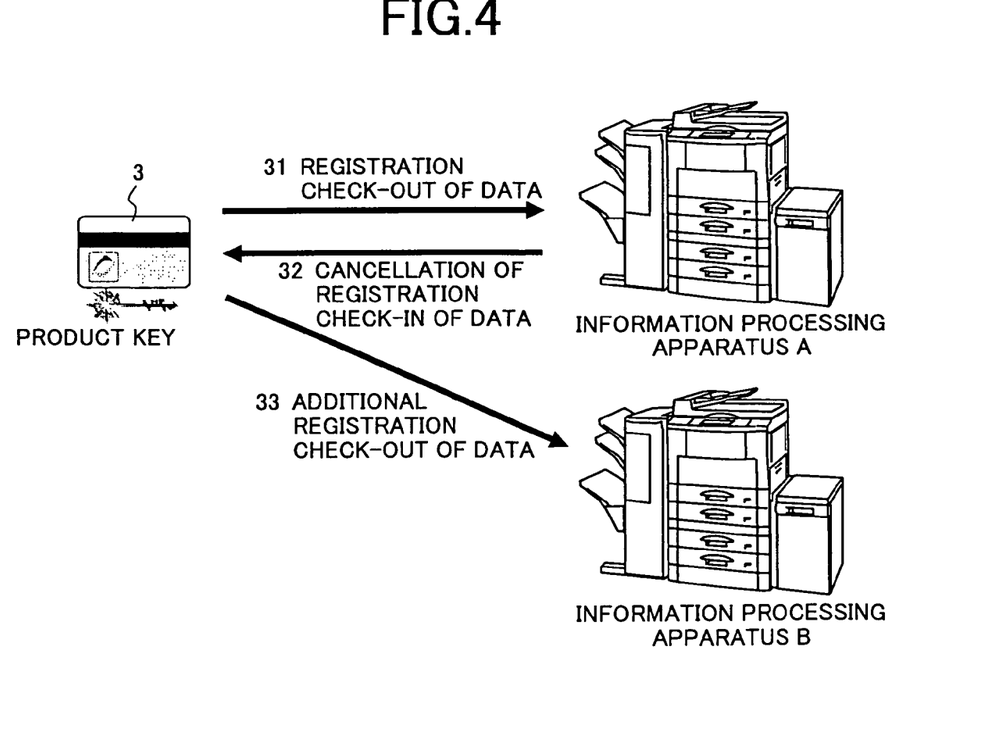
FIG. 4 is a view showing how registration and cancellation of registration of an information processing apparatus is conducted using an information storing device.

FIG. 4 is a view showing how registration and cancellation of the registration of the information processing apparatus is conducted by using the information storing device.

The information storing device 3 is connected to the information processing apparatus A. Assignment of a license (check-out) is conducted as registration 31 between the information processing apparatus A and information storing device 3. The license which is assigned to the information processing apparatus A is returned (check-in) as cancellation of registration 32. An assignment of a license to an information processing apparatus B which is a new apparatus is conducted as an additional registration 33. Control is conducted so that the product key (function restriction cancellation key) is not used so that the number of possible function extensions (the number of licenses) which information storing device 3 preliminarily possesses is not exceeded.

The product key is a key for achieving a sale for each function of the information processing apparatus. Although all available functions are essentially included in the information processing apparatus, the use of the functions is restricted unless special operation is conducted. A product key is issued for the function which is desired by the user under this condition. Cancellation of the restriction of the use of functions in the information processing apparatus allows only functions which are desired by the user to be provided to the user. For example, if the user desires to use network scanner function, the network scanner function will be available for the user by the following procedure.

(1) An information processing apparatus having a network scanner function is purchased. However, the network scanner function can not be used since this function is prevented from being used by a software protection at this phase.

(2) A "network scanner option" which is a product key trade article is purchased for registering information on the information processing apparatus of (1).

(3) A product key is generated based upon the above registered information and is input into the information processing apparatus for canceling the protection of the network scanner function.

The network scanner function can be used by the above-mentioned procedure.

The personal computer (PC) 1 is connected to, for example, wide area network via the communication board 25 so that it is connected to a product key issuing server 2. The product key issuing server 2 is a license management server which is operated by the wide area network and issues a key for canceling the function use restriction (hereinafter referred to as "Product key") A program for accessing the product key issuing server 2 from PC 1 is activated for conducting the registration of user information and input of authentication information 4.

If the product key issuing server 2 authenticates the user, the server issues a product key management information 5 which is necessary to manage the identification number, a product key generating program, product key related information, device certificate, etc. as product key related information for the information storing device. The server access program of PC 1 writes the product key management information 5 in the information storing device 3 in accordance with a predetermined procedure. At this time, the information is protected by conducting an encryption and information access restriction so that the written information can not be read by user other than those having authentication information. Encryption is conducted by using information fed from the product key issuing server 2 as a key. The key for encryption can be decrypted by only limited information processing apparatus. The information access restriction is conducted by a program written in the information storing device. Related information can not be read by those other than users having authentication information.

Now, check-out (license assignment) processing will be described.

Figure 5:
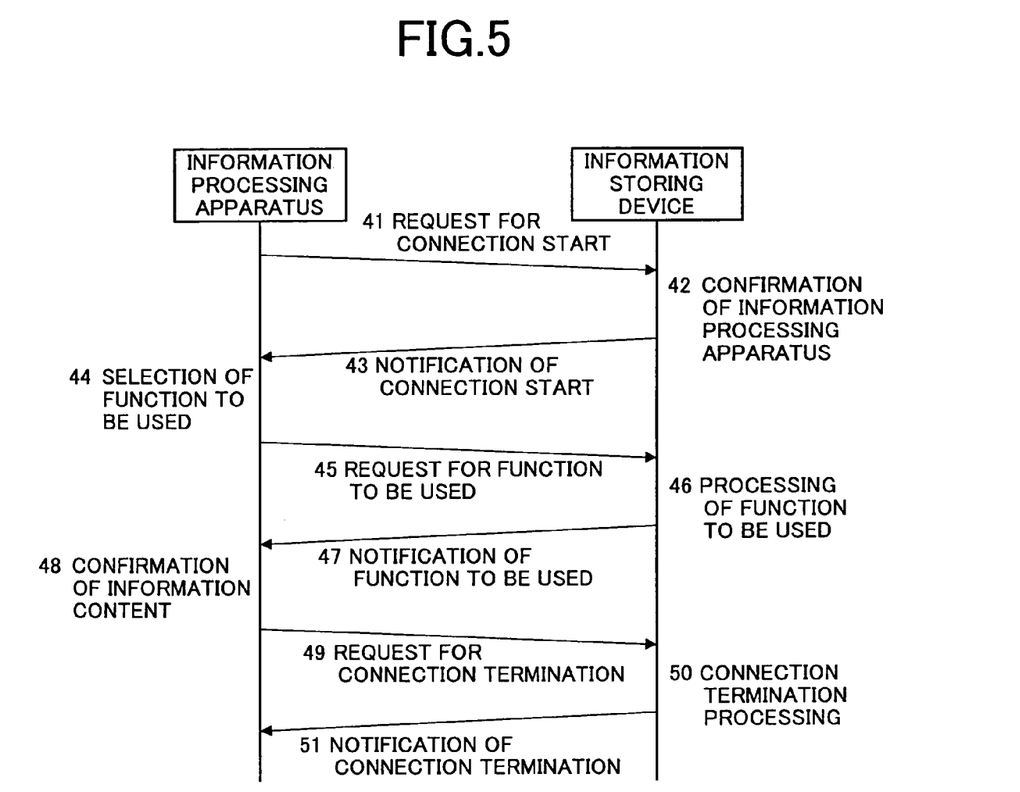
FIG. 5 is a sequence chart showing check out processing.
Figure 6:
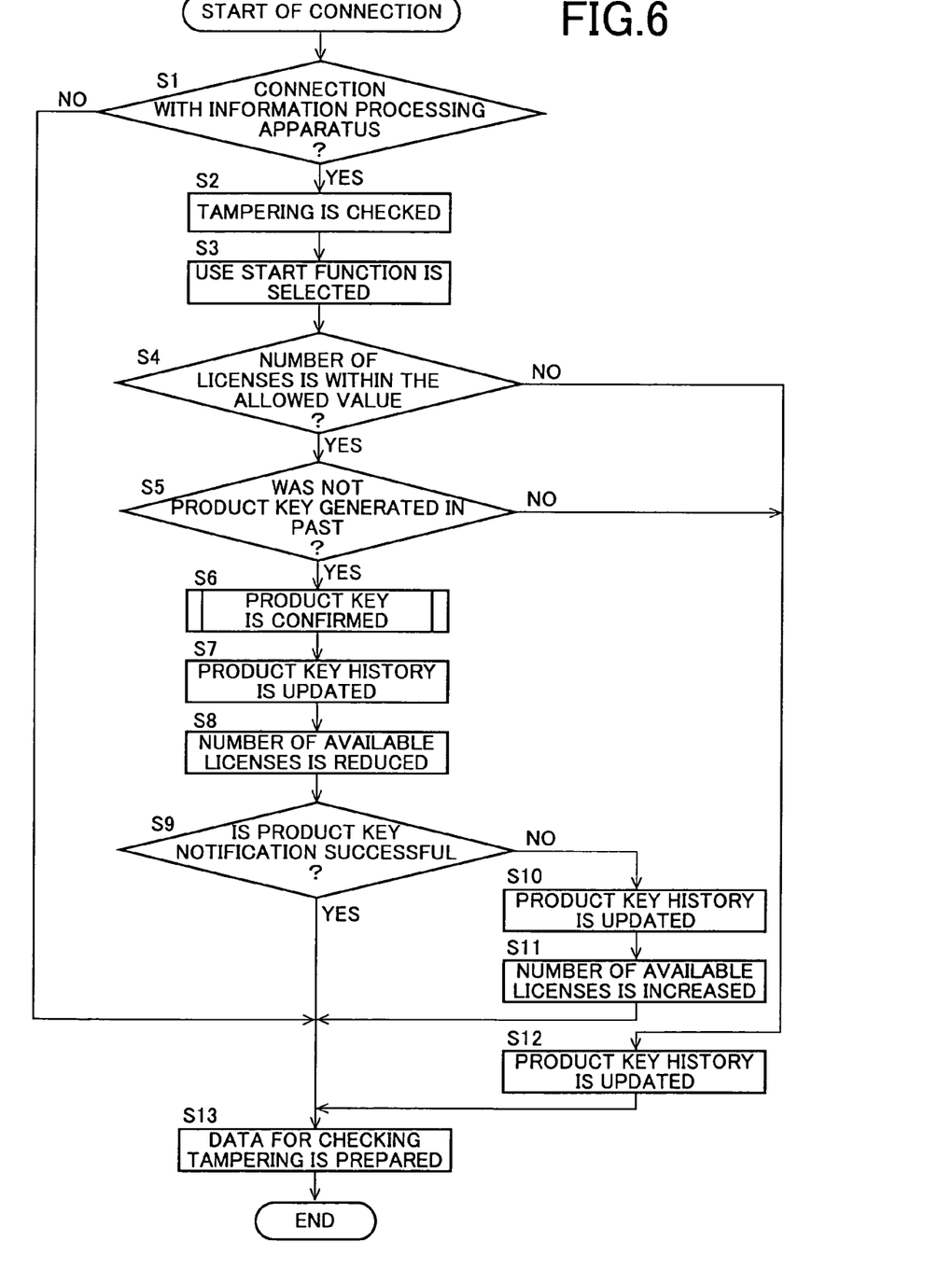
FIG. 6 is a flow chart showing the steps of check out processing.

FIG. 5 is a sequence chart showing the check-out processing. FIG. 6 is a flow chart showing the procedure of the check-out processing.

The information storing device in which the product key management information is written is connected to the information processing apparatus such as digital multi-function printer. Communication which is subsequent to this will be conducted by encrypting the content of the communication by using a public key recorded in the information storing device. The public key may be recorded in the information processing apparatus. Alternatively, high security communication such as SSL (Secure Socket Layer) communication may be conducted.

The information processing apparatus such as digital multi-function printer issues a connection start request 41 together with preliminarily held authentication information in order to use information held in the information storing device. The information storing device confirms the authentication information to make a determination 42 whether the information processing apparatus is authenticated. If the authentication information is invalid, no reply is conducted. If the authentication information is valid, an operation is continued to issue a connection start notification 43. Subsequently, function to be used by the user in the information processing apparatus is chosen 44 and a request for function to be used 45 responsive to the input is issued. Information which is communicated at this time is concerned with the identification number of the information processing apparatus and the function to be used which issues the user request.

The information storing device receives the request to conduct a step for processing the function to be used 46 at which it is determined whether the request is possible, and notifies a result at a use function notification 47. The information which is notified includes acceptance or rejection of a request and a product key if the request is accepted. The information processing apparatus conducts an information content confirmation 48 in response to the notification. If the request is allowed, the information processing apparatus cancels the restriction of the function by using the product key. If it is not allowed, the apparatus notifies the user of its reason. Thereafter a connection termination request 49 is conducted. After a connection termination processing 50 is conducted in the information storing device, a series of communication are concluded with a connection termination notification 51.

The detail of check-out processing will be described with reference to a flow chart of FIG. 6.

First, a selection whether the information processing apparatus is to be connected is made (step S1). When the connection is started, the information storing device checks whether the product key related information in the apparatus has been tampered (step S2). This tampering check is conducted by comparing tampering check information which is obtained and saved by encrypting the product key related information using a specific hash function after previous check-in and check-out with a value which is obtained by encrypting present product key related information by the hash function and checking whether there is no difference therebetween. At a time when a notification of use start function selection (step S3) from the information processing apparatus is received after checking of tampering, a check is made in response to an inquiry whether the number of licenses is within the allowable range (step S4) and whether a product key was generated for the same information processing apparatus in past times (step S5). If the check at step S4 or step S5 is failed, only updating of the product key history is conducted (step S12) and conduction of updating is informed to the information processing apparatus and processing of check-out is completed. If checks at steps S4 and S5 are successful, confirmation of the product key is conducted (step S6).

Figure 8:
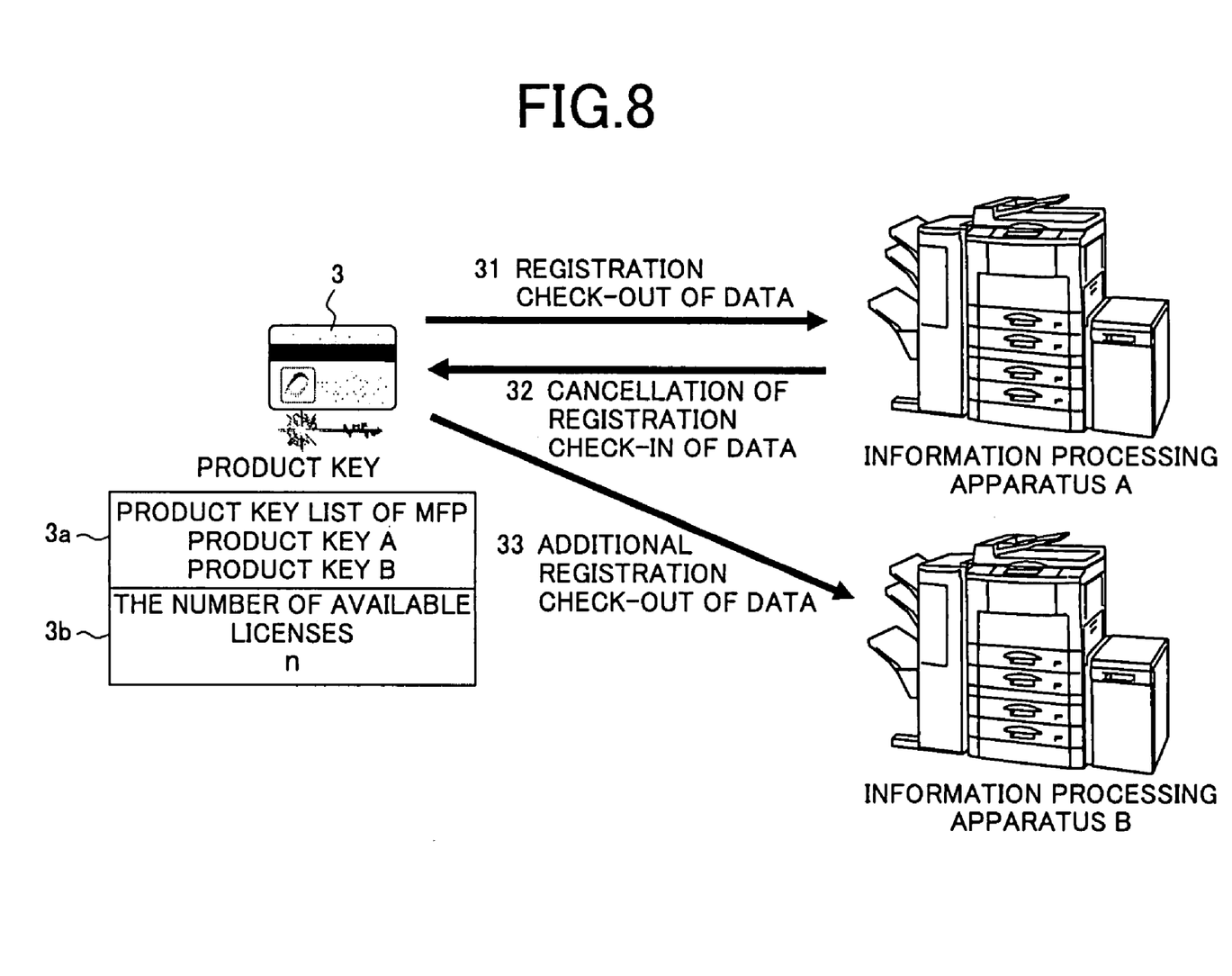
FIG. 8 is a view showing how registration and cancellation of registration is conducted in the information processing apparatus of embodiment 1 and product key related information which is held in the information storing device.

FIG. 8 is a view showing how registration and cancellation of registration is conducted in the information processing apparatus of embodiment 1 together with the product key related information which is held in the information storing device. The configuration of the product key related information in the information processing apparatus of the embodiment 1 is shown in FIG. 8. The information storing device 3 holds a list of product keys 3a such as product key A and product key B, one for each available function and the number of licenses 3b.

The object of confirmation processing of the product key at step S6 is to confirm whether there is a product key for the connected information processing apparatus in the list of the product keys stored in the product key related information. If there is a product key therein, product key history is updated (step S7). After the number of available licenses is reduced (step S8), the information processing apparatus is informed of the product key (step S9). If the notification is failed, the product key history is updated (step S10) and the number of the available licenses is increased to an original number (step S11). When notification at step S9 is completed, data for checking tampering is prepared to complete the operation (step S13).

Now, check-in (returning of license) will be described.

Figure 7:
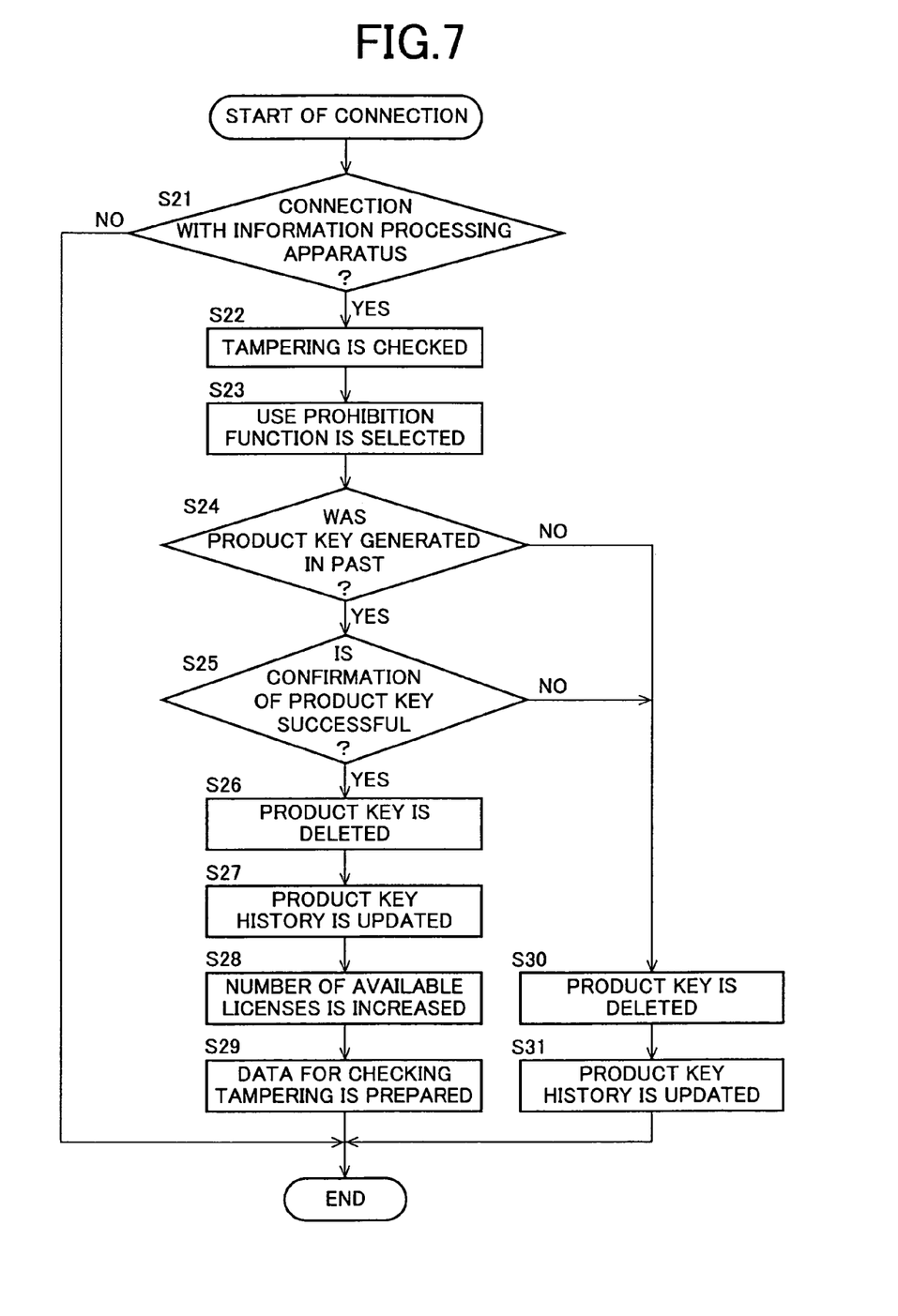
FIG. 7 is a flow chart showing the steps of check in processing.

FIG. 7 is a flow chart showing the procedure of check-in processing.

The sequence of connection between the information processing apparatus and the information storing device is identical with that of the check-out processing. First, choosing is made whether the information storing device is to be connected to the information processing apparatus (step S21). If it is not to be connected with the information processing apparatus, processing is completed as it is. When connection is initiated, the information storing device checks whether the product key related information in the device is tampered (step S22). Tampering check is conducted as follows.

(1) A hash value of the whole of the data in the information storing device is saved as tampering check data in advance.

(2) A hash value is generated from the present data in the information storing device by using the same hash function.

(3) A tampering check data is compared with the present hash value, and if the tampering check data is identical with the present hash value, it is determined that no tampering has been conducted.

If there is no problem in tampering check, check is conducted whether the product key was checked out in past times (step S24) when selection of prohibition to use function is noticed from the information processing apparatus (step S23). If the check is failed, processing of check-in is terminated by notifying the information processing apparatus of the failure of the check. Thereafter, check is conducted by using the informed product key whether the product key is authenticated or not (step S25). If the product key is authenticated, deletion of the product key from the information processing apparatus (step S26), update of product key history (step S27) and processing to increase the number of available licenses (step S28) are conducted. Thereafter, data for tampering check is prepared (step S29) for completing the operation. If operation is not normally completed at step S24 or S25, update of the product key history is conducted (step S31) for completing the operation. Alternatively, cancellation of function restriction of the information processing apparatus may be terminated and the product key may be deleted (step S30).

Embodiment 2

Figure 9:
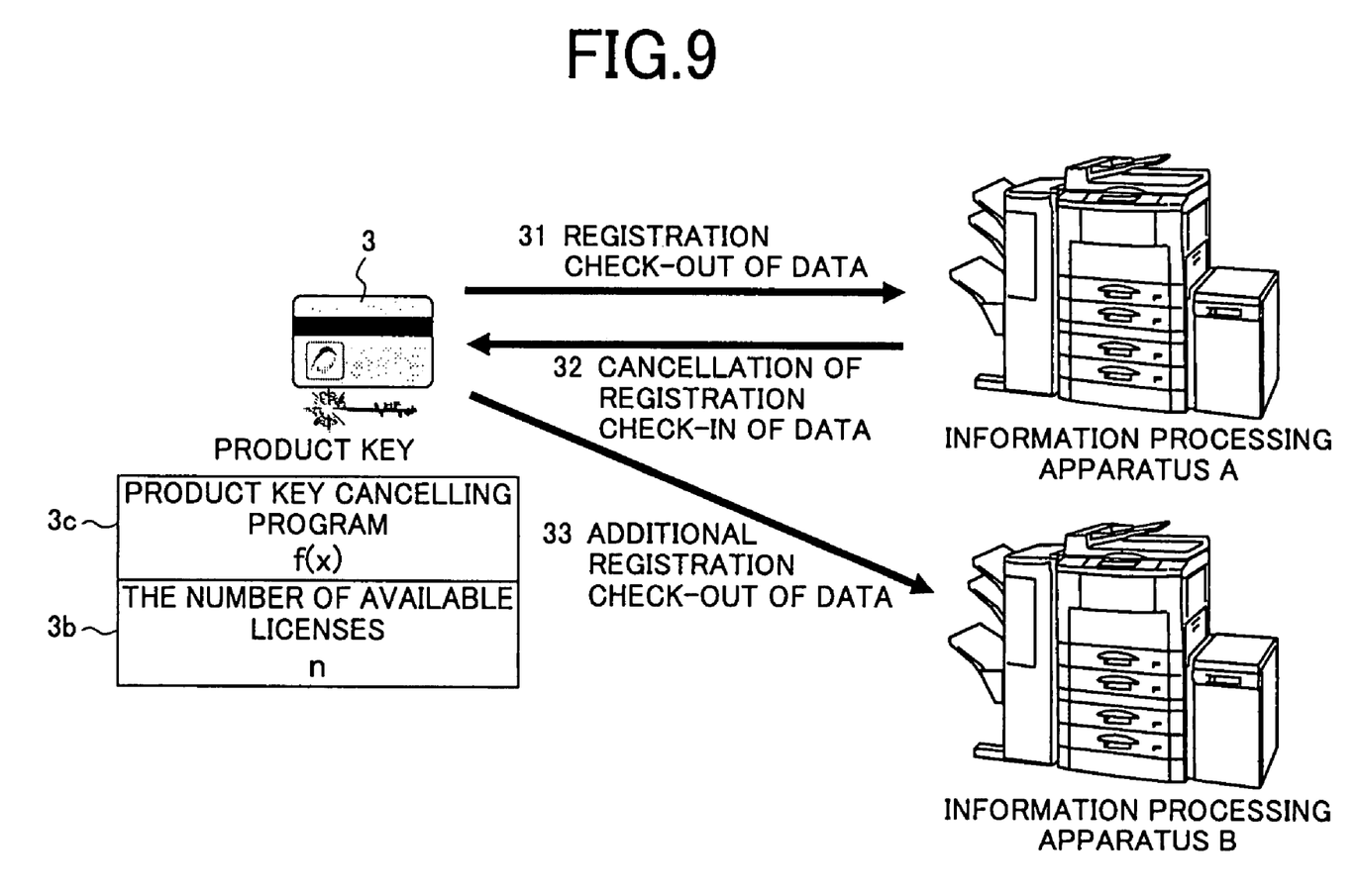
FIG. 9 is a view showing how registration and cancellation of registration is conducted in the information processing apparatus of embodiment 2 and product key related information which is held in the information storing device.

FIG. 9 is a view showing how registration and cancellation of registration in the information processing apparatus of embodiment 2 is conducted and the product key related information which is held in the information storing device.

The configuration of the product key related information in the information processing apparatus of embodiment 2 is shown in FIG. 9. The information storing device 3 holds a product key canceling program 3c including a product key generating function f(x) and the number of licenses 3b which is a value of n. When the product key is confirmed on check-out, a product key is dynamically generated by using specific information of the information processing apparatus A, B and a product key generating function.

On check-in, a product key is generated again by using the product keys which were informed from the information processing apparatus A, B and their specific information. A check is conducted whether there is a discrepancy therebetween.

Embodiment 3

Figure 10:
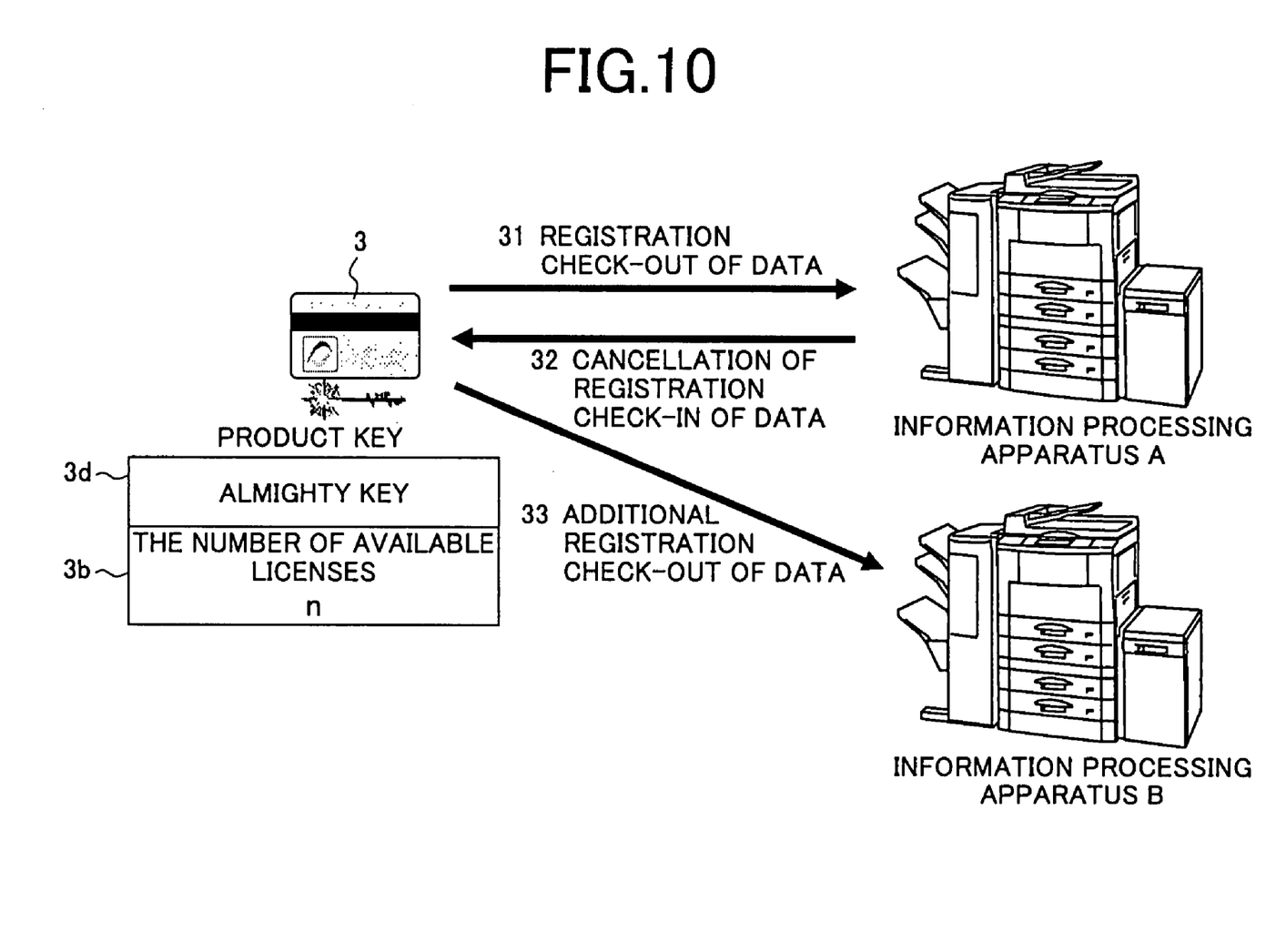
FIG. 10 is a view showing how registration and cancellation of registration is conducted in the information processing apparatus of embodiment 3 and product key related information which is held in the information storing device.

FIG. 10 is a view showing how registration and cancellation of registration in the information processing apparatus of embodiment 3 is conducted and product key related information which is held in the information storing device.

The configuration of the product key related information in the information processing apparatus of embodiment 3 is shown in FIG. 10. The information storing device 3 holds an almighty key 3d which is a product key and the number of licenses 3b which is a value of n. A product key is generated by encrypting the almighty key and the number of licenses using specific information given by the information processing apparatus A, B as a key. A term "almighty key 3d" used herein means a special key which enables all of the restriction of the functions of the information processing apparatus including digital multi-function printer to be cancelled. The information storing device 3 prevents unauthorized use of the information processing apparatus by managing the almighty key 3d with the number of licenses 3b.

When check-out is conducted, this product key is informed to the information processing apparatus A or B. The information processing apparatus A or B decodes the product key to acquire an almighty key for canceling the protection of the functions.

When check-in is conducted, a product key which is encrypted by using the specific information as a key is informed from the information processing apparatus A to the information storing device 3 to determine whether the product key which is decoded in the information storing device 3 is identical with the almighty key or not. Such a mechanism of check-in and check-out manages the information processing apparatus so that the almighty key is not leaked.

Embodiment 4

Figure 11:
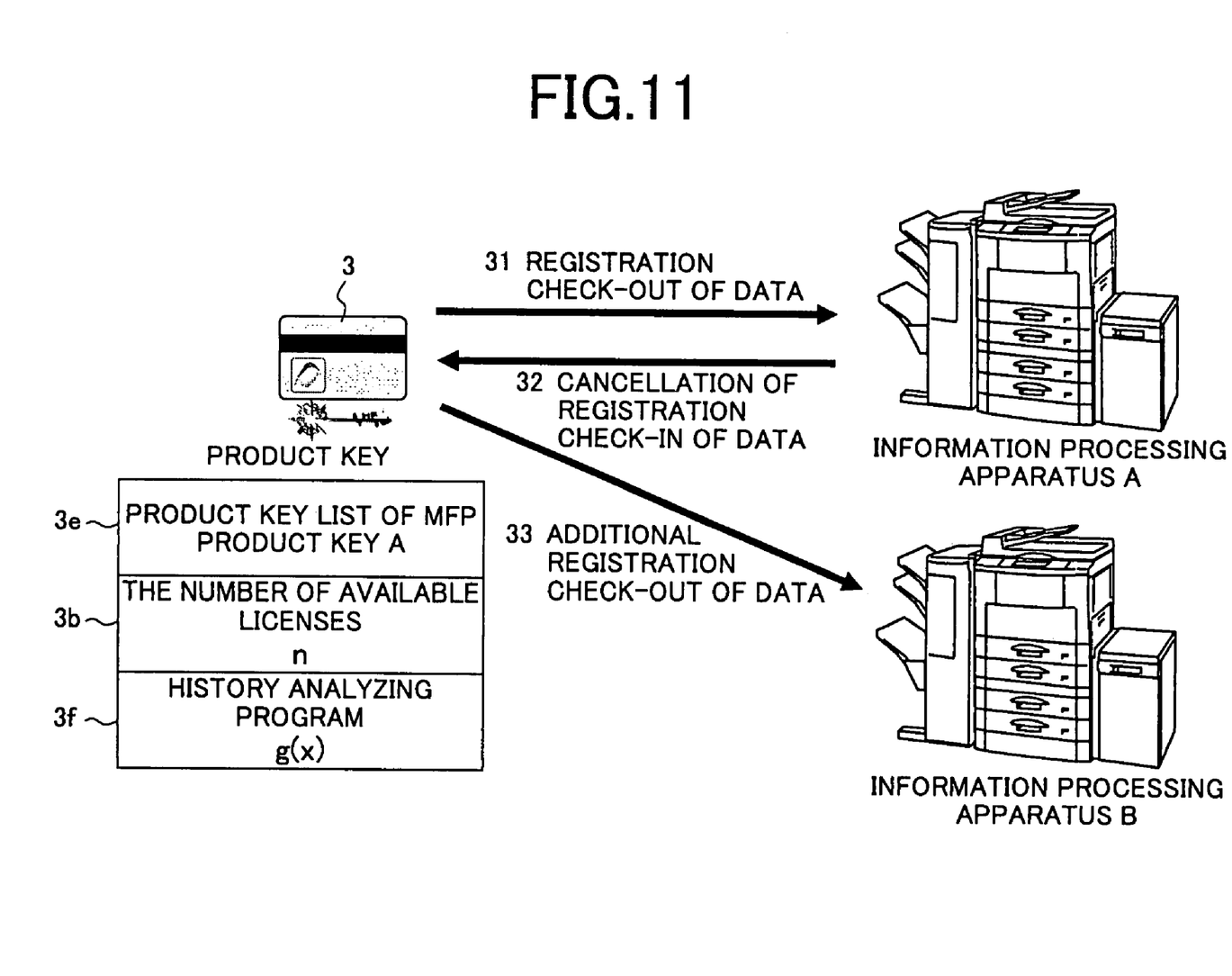
FIG. 11 is a view showing how registration and cancellation of registration is conducted in the information processing apparatus of embodiment 4 and product key related information which is held in the information storing device.

FIG. 11 is a view showing how registration and cancellation of registration in the information processing apparatus of embodiment 4 and product key related information which is held in the information storing device.

The configuration of the product key related information in the information processing apparatus of embodiment 4 is shown in FIG. 11. The information storing device 3 holds a list 3e of product keys when the information processing apparatus is initially introduced, the number of licenses 3b and a history analyzing program 3f. Operation when a product key is initially informed to the information processing apparatus A is identical with that of the embodiment 1. When check-in is conducted, information which is specific to the information processing apparatus A is saved as history information. If the product key A which was used once is checked out to the other information processing apparatus B, a product key A and a specific number of the information processing apparatus A which firstly checked out the product key A are informed to the information processing apparatus B. The internal logic of the information processing apparatus B conducts function restriction canceling processing by using the product key A and the specific number of the information processing apparatus A which is simultaneously fed.

Embodiment 5

Figure 12:
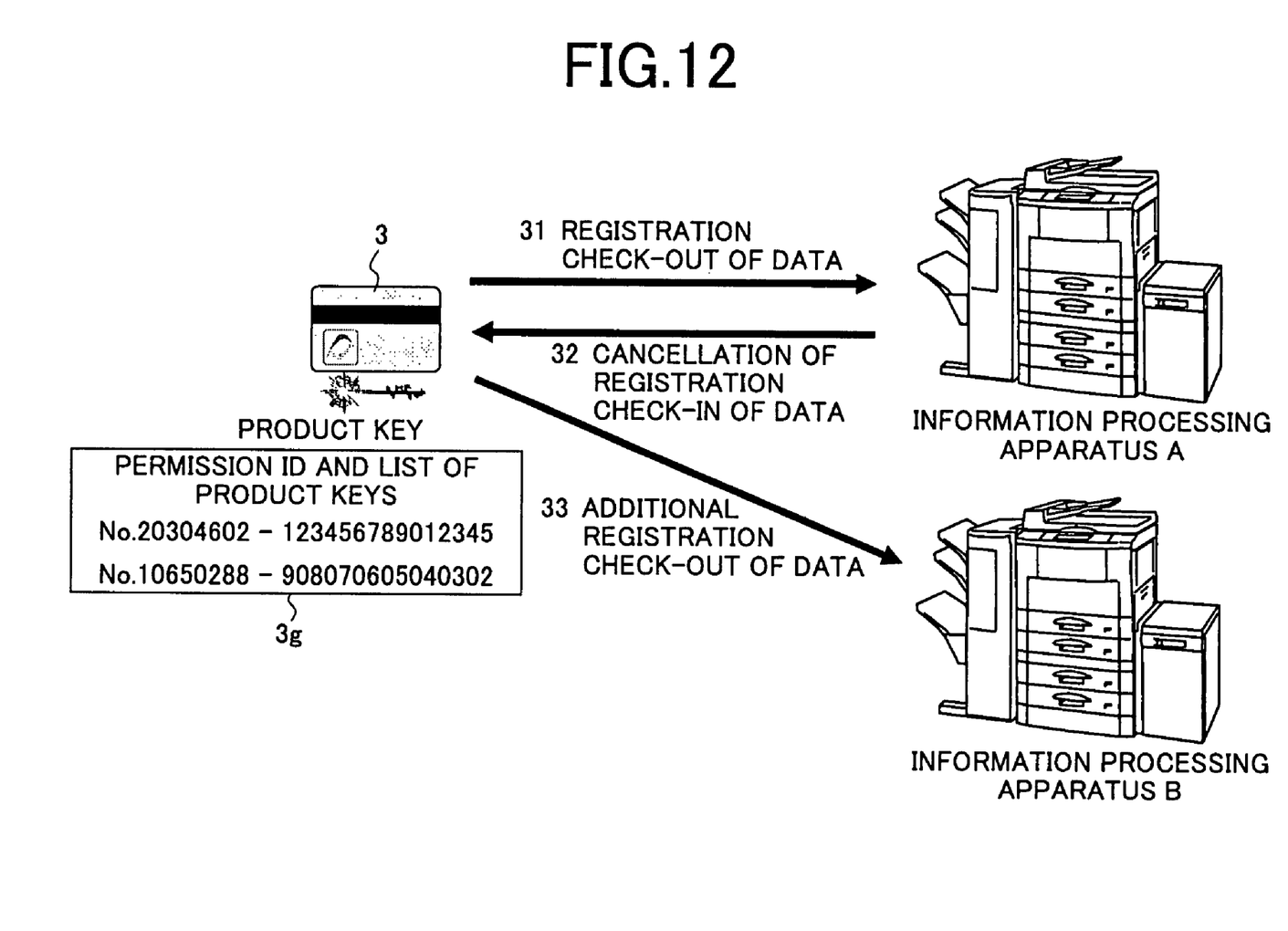
FIG. 12 is a view showing how registration and cancellation of registration is conducted in the information processing apparatus of embodiment 5 and product key related information which is held in the information storing device.

FIG. 12 is a view showing how registration and cancellation of registration in the information processing apparatus of embodiment 5 is conducted and product key related information held in the information storing device.

The configuration of the product key related information in the information processing apparatus of embodiment 5 is shown in FIG. 12. The information storing device 3 holds a permission ID which is specifically assigned to the information storing device and a list 3g of the product keys. When check-out is conducted, a combination of a product key and a permission ID is informed to the information processing apparatus. The information processing apparatus holds a function h(x) and checks the product key by using the permission ID which was informed from the information storing device 3 to cancel the function restriction. The information storing device manages the combination of which permission ID with the product key is used. Unless check-in is conducted, check-out processing is not conducted by using a combination of the same permission ID with the product key.

Since communication content is not changed even if the information processing apparatus of embodiments 3, 4, 5 are changed, use of the unauthorized product key is possible by interception of communications. In order to prevent such unauthorized use, the communication content is constantly changed by communicating with encrypted product key. A procedure for encryption is as follows.

On check-out (1) The information storing device generates ID used for encryption.

(2) The information storing device encrypts a product key by using ID.

(3) The information storing device encrypts ID by using a public key of the information processing apparatus.

(4) The information storing device informs encrypted ID and a product key to the information processing apparatus.

(5) The information processing apparatus decodes the product key to conduct check-out processing.

On check-in (1) The information processing apparatus generates ID used for encryption.

(2) The information processing apparatus encrypts a product key by using ID.

(3) The information processing apparatus encrypts ID by using a public key of the information storing device.

(4) The information processing apparatus informs encrypted ID and a product key to the information storing device.

(5) The information storing device decodes the product key to conduct check-in processing.

According to the present invention, advantages can be obtained as follows.

In accordance with the present invention, an information storing device which holds information for function extension and information on the number of possible function extensions is connected to an information processing apparatus having functions, the use of which is restricted. Since a determination is made based upon the data of the number of possible function extensions held in the information storing device whether or not use restriction of function is cancelled, the cancelled function can be transferred from desired information processing apparatus to other information processing apparatus like physical option, so that the function for which a user paid can be quickly transferred at a low cost.

Also, in accordance with the present invention, since data on a communication path between an information processing apparatus and an information storing device is encrypted and decrypted, it is possible to suppress unauthorized cancellation of the use-restricted function depending upon unauthorized copying of data used in the information processing apparatus.

Also, in accordance with the present invention, since authentication is conducted on an access to data in an information storing device, reading and tampering of a program when an information storing device is connected to an unwanted apparatus other than the information processing apparatus can be prevented.

Also, in accordance with the present invention, since tampering of information in the information storing device is checked, tampering can be detected if any, so that processing can be stopped. Unnecessary external disclosure of information can be prevented since the processing is stopped.

Also, in accordance with the present invention, since the information processing apparatus communicates with the information storing device which holds a function restriction canceling key and data of the number of possible function extensions and the information storing device has a list of function restriction canceling keys, cancellation of function restriction can be quickly conducted.

Also, in accordance with the present invention, the information processing apparatus communicates with the information storing device which holds information on a function restriction canceling key generating function and the number of possible function extensions for dynamically generating a function restriction canceling key by using specific information from the information processing apparatus. Since the information storing device does not has a list of the function restriction canceling key and the canceling key is generated on site, it is also applicable to an information processing apparatus in which a canceling key list has not been registered in advance.

Also, in accordance with the present invention, an information processing apparatus communicates with an information storing device which holds an almighty key which enables the cancellation of all restriction of the functions of information processing apparatus and data of the number of possible function extensions or the number of times of cancellations of the restricted functions so that extension of functions can be conducted without communicating with a canceling key issuing server. Since the canceling key is managed with only the number of licenses, the management is easy.

Also, in accordance with the present invention, the information processing apparatus communicates with the information storing device which holds a function restriction canceling key for initial introduction, information on the number of possible function extensions, and history of start and end of use of functions so that the restriction of functions can be quickly cancelled. Since cancellation of the restricted functions is conducted by using the history information, cancellation of the restricted functions is also applicable to any information processing apparatus in which a canceling key has not been registered in advance. It is also possible to restrict the cancellation of the restricted functions by using the history information.

Also, in accordance with the present invention, since the information processing apparatus communicates with the information storing device which holds information on a combination of a specifically assigned permission ID with a function restriction canceling key and the number of the possible function extensions so that the information storing device holds a canceling key using an ID assigned thereto, the information storing device does not have any specific information of the information processing apparatus. Therefore, the function restriction canceling operation is applicable to all information processing apparatus.

Also, in accordance with the present invention, the information storing device comprises means for generating a temporary random number ID-1 for encrypting a function restriction canceling key to encrypt the function restriction canceling key by using the random number ID-1 on check-out communication for assigning a function restriction canceling key from the information storing device to the information processing apparatus, means for encrypting the random number ID-1 by using a public key of the information processing apparatus to communicate it to the information processing apparatus, and the information processing apparatus comprises means for generating a random number ID-2 for encrypting the function restriction canceling key to encrypt the function restriction canceling key by using the random number ID-2 on check-in communication for returning a function restriction canceling key from the information processing apparatus to the information storing device, and means for encrypting the random number ID-2 by using a public key of the information storing device to communicate it to the information storing device. Since a change in content of information can be caused even if when the same data is communicated in order to prevent unauthorized use of the number of licenses used, tampering of data for check-out and check-in can be prevented. Unauthorized use of licenses which is more than the number of licenses can be thus prevented.

The invention claimed is:

1. An information processing apparatus having a plurality of functions, use of which is restricted, wherein the apparatus comprises:
a determining portion for determining whether or not one of the use restricted functions is cancelled based upon a request for function extension and information on the number of possible function extensions, which is held in an information storing device connected to the information processing apparatus, the determining portion receiving a product key to cancel restriction of the selected function if the request is accepted,
wherein the apparatus comprises an encrypting and decrypting portion for encrypting and decrypting information on a communication path between the information processing apparatus and the information storing device for preventing unauthorized use of the information processing apparatus.

2. The information processing apparatus as defined in claim 1, wherein the apparatus comprises an authenticating portion for authenticating an access to information in the information storing device to prevent unauthorized use of the apparatus.

3. The information processing apparatus as defined in claim 1, wherein the apparatus comprises a checking portion for checking tampering of information in the information storing device to prevent unauthorized use of the apparatus.

4. The information processing apparatus as defined in any one of claims 1 through 3, wherein the apparatus communicates with the information storing device which holds information on a list of function restriction canceling keys necessary for function extension and the number of the possible function extensions and confirms the information on the number of the possible function extensions and acquires the function restriction canceling key if number of the possible function extensions is within the allowable range.

5. The information processing apparatus as defined in any one of claims 1 through 3, wherein the apparatus communicates with the information storing device which holds a function restriction canceling key generating function necessary for function extension and information on the number of the possible function extensions and dynamically generates a function restriction canceling key by using specific information from the information processing apparatus, confirms the information on the number of the possible function extensions and acquires the function restriction canceling key if the number of the possible function extensions is within the allowable range.

6. The information processing apparatus as defined in any one of claims 1 through 3, wherein the apparatus communicates with the information storing device which holds an almighty key which is capable of canceling all function restriction of information processing apparatus and information on the number of the possible function extensions, confirms the information on the number of the possible function extensions and acquires a function restriction canceling key if the number of the possible function extensions is within the allowable range.

7. The information processing apparatus as defined in any one of claims 1 through 3, wherein the apparatus communicates with the information storing device which holds a function restriction canceling key when the functions are initially introduced to the apparatus, information on the number of the possible function extensions and information on history of use start and completion, confirms the information on the number of the possible function extensions, acquires a function restriction canceling key if the number of the possible function extensions is within the allowable range and enables the function restriction canceling key to be used in other information processing apparatus.

8. The information processing apparatus as defined in any one of claims 1 through 3, wherein the apparatus communicates with the information storing device which holds information on a combination of a specifically assigned permission ID with a function restriction canceling key and information on the number of the possible function extensions, checks the function restriction canceling key by using the permission TD, confirms the information on the number of the possible function extensions and acquires the function restriction canceling key if the number of the possible function extensions is within the allowable range.

9. The information processing apparatus as defined in claim 1, wherein the information storing device comprises an encrypting portion for generating a temporary random number ID-1 for encrypting a function restriction canceling key to encrypt the function restriction canceling key by using the random number ID-1 on check-out communication for assigning a function restriction canceling key from the information storing device to the information processing apparatus, and a transferring portion for encrypting the random number ID-1 by using a public key of the information processing apparatus to communicate it to the information processing apparatus, and wherein the information processing apparatus comprises an encrypting portion for generating a random number ID-2 for encrypting the function restriction canceling key to encrypt the function restriction canceling key by using the random number ID-2 on check-in communication for returning a function restriction canceling key from the information processing apparatus to the information storing device, and a transferring portion for encrypting the random number ID-2 by using a public key of the information storing device to communicate it to the information storing device.

10. An information storing device, wherein the device holds a request for function extension and information on the number of possible function extensions as information which is necessary for management of the function extension of an information processing apparatus having a plurality of functions, the use of which is restricted and the device can be connected to the information processing apparatus, the information processing apparatus receiving a product key to cancel restriction of the selected function if the request is accepted,
wherein the information storing device is connected to a product key issuing server and holds information necessary for management of function extension of the information processing apparatus which is issued by the product key issuing server.

11. A system for extending functions of an information processing apparatus, wherein the system comprises:
an information processing apparatus having a plurality of functions, the use of which is restricted; and
an information storing device in which a request for function extension and information on a number of possible function extensions is recorded therein, a check-out for assigning a function restriction canceling key to the information processing apparatus from the information storing device is conducted, a check-in for returning the function restriction canceling key from the information processing apparatus to the information storing device is conducted, and the canceling of the restricted function of the information processing apparatus is conducted based upon the information on the number of possible function extensions held in the information storing device,
wherein the information processing apparatus receives a product key to cancel restriction of the selected function if the request is accepted.

12. A method for extending functions of an information processing apparatus, wherein the method comprises the steps of:
connecting an information storing device in which a request for function extension and information on the number of possible function extensions is held to an information processing apparatus having a plurality of functions, the use of which is restricted;
selecting a use start function in the information processing apparatus;
checking whether information on the number of the possible function extensions concerning the use start function is within the allowable range;
decreasing the number of the possible function extensions if it is within the allowable range; and
informing the information processing apparatus of the request for function extension, wherein the information processing apparatus receives a product key to cancel restriction of the selected function if the request is accepted.

13. A program for extending the functions of an information processing apparatus, wherein the method for extending functions as defined in claim 12 is conducted.

14. A method for deleting functions of an information processing apparatus, wherein the method comprises the steps of:
connecting an information storing device in which a request for function extension and information on the number of possible function extensions is held to an information processing apparatus having a plurality of functions, the use of which is restricted;
selecting a use terminating function in the information processing apparatus;
deleting a function restriction canceling key for selected use terminating function from the information processing apparatus, wherein the information processing apparatus receives a product key to cancel restriction of the selected function if the request is accepted; and
increasing the number of possible function extensions.

15. A program for deleting the functions of an information processing apparatus, wherein the method for deleting functions as defined in claim 14 is conducted.

* * * * *